(12) United States Patent
Ide et al.

(10) Patent No.: US 7,162,649 B1
(45) Date of Patent: Jan. 9, 2007

(54) METHOD AND APPARATUS FOR NETWORK ASSESSMENT AND AUTHENTICATION

(75) Inventors: Curtis E. Ide, Roswell, GA (US); Philip C. Brass, Roswell, GA (US); Theodore R. Doty, Roswell, GA (US)

(73) Assignee: Internet Security Systems, Inc., Atlanta, GA (US)

( * ) Notice: Subject to any disclaimer, the term of this patent is extended or adjusted under 35 U.S.C. 154(b) by 1087 days.

(21) Appl. No.: 09/607,375

(22) Filed: Jun. 30, 2000

(51) Int. Cl.
G06F 11/30 (2006.01)
G06F 15/173 (2006.01)
G06F 15/16 (2006.01)
H04L 9/00 (2006.01)
H04K 1/00 (2006.01)

(52) U.S. Cl. .................. 713/201; 713/200; 713/202; 713/155; 713/156; 713/182; 713/159; 709/223; 709/224; 709/225; 709/226; 709/227; 709/228; 709/229

(58) Field of Classification Search ........ 713/200–202, 713/155–156, 161, 173, 182, 159; 709/217, 709/219, 220, 223–229
See application file for complete search history.

(56) References Cited

U.S. PATENT DOCUMENTS

| | | | |
|---|---|---|---|
| 4,223,380 A | 9/1980 | Antonaccio et al. | |
| 4,400,769 A | 8/1983 | Kaneda et al. | |
| 4,672,609 A | 6/1987 | Humphrey et al. | |
| 4,773,028 A | 9/1988 | Tallman | |
| 4,819,234 A | 4/1989 | Huber | |
| 4,975,950 A | 12/1990 | Lentz | |
| 5,032,979 A | 7/1991 | Hecht et al. | |
| 5,121,345 A | 6/1992 | Lentz | |
| 5,204,966 A | 4/1993 | Wittenberg et al. | |
| 5,210,704 A | 5/1993 | Husseiny | |
| 5,274,824 A * | 12/1993 | Howarth ............ | 713/167 |
| 5,278,901 A | 1/1994 | Shieh et al. ....... | 380/4 |
| 5,309,562 A | 5/1994 | Li | |
| 5,311,593 A | 5/1994 | Carmi | |
| 5,345,595 A | 9/1994 | Johnson et al. | |

(Continued)

FOREIGN PATENT DOCUMENTS

EP 0 636 977 5/2001

(Continued)

OTHER PUBLICATIONS

PC User, Jun. 29, 1994, n238, p. 108(16).*

(Continued)

Primary Examiner—Ayaz Sheikh
Assistant Examiner—Jenise Jackson
(74) Attorney, Agent, or Firm—King & Spalding LLP

(57) ABSTRACT

Providing a user with assurance that a networked computer is secure, typically before completion of the log-in operation. This can be accomplished by extending the local log-in process to perform a host assessment of the workstation prior to requesting the user's credentials. If the assessment finds a vulnerability, the log-in process can inform the user that the machine is or may be compromised, or repair the vulnerability, prior to completion of the log-in operation. By performing vulnerability assessment at the level of the workstation, a network server is able to determine whether the workstation is a "trusted" platform from which to accept authentication requests. If the vulnerability assessment shows that the workstation is compromised, or if the possibility of remote compromise is high, the network server can elect to fail the authentication on the grounds that the workstation cannot be trusted. Optionally, a vulnerability assessment tool may be able to repair the vulnerability of the workstation, and then allow the authentication to proceed.

16 Claims, 9 Drawing Sheets

U.S. PATENT DOCUMENTS

| | | |
|---|---|---|
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus ................... 395/187.01 |
| 5,899,999 A | 5/1999 | De Bonet |
| 5,907,834 A | 5/1999 | Kephart et al. |
| 5,919,257 A * | 7/1999 | Trostle ....................... 713/200 |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A * | 12/1999 | Misra et al. ................. 713/201 |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 * | 2/2001 | Todd et al. .................... 726/25 |
| 6,195,687 B1 | 2/2001 | Greaves et al. |
| 6,199,181 B1 | 3/2001 | Rechef et al. |
| 6,205,552 B1 | 3/2001 | Fudge |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 * | 8/2001 | Gleichauf et al. ........... 707/102 |
| 6,298,445 B1 | 10/2001 | Shostack et al. |
| 6,301,668 B1 * | 10/2001 | Gleichauf et al. ........... 713/201 |
| 6,314,520 B1 * | 11/2001 | Schell et al. ................. 713/200 |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 * | 11/2001 | Gleichauf et al. ............. 714/37 |

| | | |
|---|---|---|
| 6,338,141 B1 | 1/2002 | Wells |
| 6,347,374 B1 | 2/2002 | Drake et al. |
| 6,353,385 B1 | 3/2002 | Molini et al. |
| 6,357,008 B1* | 3/2002 | Nachenberg ............... 726/24 |
| 6,377,994 B1* | 4/2002 | Ault et al. .................. 709/229 |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1* | 8/2002 | Olbricht ..................... 358/442 |
| 6,434,615 B1* | 8/2002 | Dinh et al. ................. 709/224 |
| 6,438,600 B1* | 8/2002 | Greenfield et al. ......... 709/229 |
| 6,445,822 B1 | 9/2002 | Crill et al. |
| 6,453,345 B1 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,470,449 B1 | 10/2002 | Blandford |
| 6,477,585 B1 | 11/2002 | Cohen et al. |
| 6,477,648 B1* | 11/2002 | Schell et al. ............... 713/200 |
| 6,477,651 B1 | 11/2002 | Teal |
| 6,484,203 B1 | 11/2002 | Porras et al. |
| 6,487,666 B1 | 11/2002 | Shanklin et al. |
| 6,496,858 B1 | 12/2002 | Frailong et al. |
| 6,499,107 B1 | 12/2002 | Gleichauf et al. |
| 6,510,523 B1* | 1/2003 | Perlman et al. ............. 713/201 |
| 6,517,587 B1 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1* | 3/2003 | Fox et al. ................... 715/736 |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1* | 6/2003 | Hummel et al. ............. 705/59 |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1* | 2/2004 | Wood et al. ................. 713/201 |
| 6,704,874 B1 | 3/2004 | Porras et al. |
| 6,708,212 B1 | 3/2004 | Porras et al. |
| 6,711,127 B1 | 3/2004 | Gorman et al. |
| 6,711,615 B1 | 3/2004 | Porras et al. |
| 6,718,383 B1 | 4/2004 | Hebert |
| 6,721,806 B1 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1* | 11/2004 | Gleichauf et al. .......... 713/201 |
| 6,839,850 B1* | 1/2005 | Campbell et al. ........... 713/200 |
| 6,871,284 B1* | 3/2005 | Cooper et al. .............. 713/200 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/054458 | 9/2000 |
| WO | WO 00/54458 | 9/2000 |
| WO | WO 01/84285 | 11/2001 |
| WO | WO 01/084285 | 11/2001 |
| WO | WO 02/006928 | 1/2002 |
| WO | WO 02/06928 | 1/2002 |
| WO | WO 02/056152 | 7/2002 |
| WO | WO 02/101516 | 12/2002 |

OTHER PUBLICATIONS

Waltner, 2000, Information Week, n 777, p. 124.*
Essex, David, E-Sleuths Make Net Safe for E-Commerce, Computerworld, Jun. 2000, pp. 1-2.
Newman, David, Intrusion Detection Systems, Data Communications, 1998, pp. 1-9.
International Search Report for PCT/US02/17161 of Dec. 31, 2002.
Hyland, et al., Concentric Supervision of Security Applications: A New Security Management Paradigm Computer Security Applications Conference, 1998, pp. 59-68.
Koilpillai et al., Recon-A Tool for Incident Detection, Tracking and Response, Darpa Information Survivability Conference and Exposition, 2000, pp. 199-206.
Alves-Foss, J., An Overview of SNIF: A Tool for Surveying Network Information Flow, Network and Distributed System Security, 1995, pp. 94-101.
Mansouri-Samani et al., A Configurable Event Service for Distributed Systems Configurable Distributed Systems, 1996, pp. 210-217.
International Search Report for PCT/US01/13769 of Mar. 8, 2002.
Jagannathan et al., System Design Document: Next Generation Intrusion Detection Expert Systems (NIDES), Internet Citation, Mar. 9, 1993, XP002136082, pp. 1-66.
Koilpillai, Adaptive Network Security Management, DARPA NGI PI Conference, Oct. 1998, pp. 1-27.
Hiverworld Continuous Adaptive Risk Management, Hiverworld, Inc., 1999-2000, pp. 1-14.
International Search Report for PCT/US02/04989of Sep. 19, 2002.
International Search Report for PCT/US02/02917 of Aug. 8, 2002.
International Search Report for PCT/US03/00155 of May 15, 2003.
NXI Communications, Inc., White Paper, NTS Security Issues, Oct. 15, 2001, pp. 1-12.
Mounji et al., Distributed Audit Trail Analysis, Proceedings of the Symposium of Network and Distributed System Security, San Diego, CA, Feb. 16-17, 1995, pp. 102-112.
Wobber et al., Authentication in the Taos Operating System, ACM Transactions on Computer Systems, vol. 12, No. 1, Feb. 1994, pp. 3-32.
Mayer et al., The Design of the Trusted Workstation: A True Infosec Product, 13th National Computer Security Conference, Washing, DC, Oct. 1-4, 1990, pp. 827-839.
Dawson, Intrusion Protection for Networks, Byte, Apr. 1995, pp. 171-172.

Buhkan, Checkpoint Charlie, PC Week Network, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, Univeristy of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14th National Computer Security Conference, Oct. 1-4, 1991, Washington, DC, pp. 167-176.

Broner et al., "IntelligentI/O Rule-Based Input-Output Processing for Operating Systems," Operating Systems Review, vol. 25, No. 3, Jul. 1991, pp. 10-26.

Drews et al., "Special Delivery—Automatic Software Distribution Can Make You a Hero," Network Computing, Aug. 1, 1994, pp. 80, 82-86,89,91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," 2nd ACM Conference on Computer and Communications Security, Nov. 2-4, 1994, Fairfax, Virginia, pp. 18-29.

Winn Schwartau, "e.Security™ -Solving 'Dumb Days' With Security Visualization," e-Security, Inc., Naples, FL 34103, 2000.

Anita D'Amico, Ph.D., "Assessment of Open e-Security Platform198 : Vendor-Independent Central Management of Computer Security Resources," Applied Visions, Inc., 1999.

"e.Security™ -Open Enterprise Security Management: Delivering an integrated, automated, centrally Managed Solution You Can Leverage Today and Tomorrow," e-Security, Inc., Naples, FL 34102, 1999.

"e.Security™ -Vision," e-Security, Inc., Naples, FL, 1999.

"e.Security™ -Administrator Workbench™ ," e-Security, Inc. Naples, FL, 1999.

"e.Security™ -Fact Sheet," e-Security, Inc., Naples, FL, 1999.

"e.Security™ -Open e-Security Platform™ ," e-Security, Inc. Naples, FL, 1999.

Babcock, "E-Security Tackles The Enterprise," Jul. 28, 1999; *Inter@ctive* Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www.InformationWeek.com.

Sean Hao, "Software protects e-commerce—e-Security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response -The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e-Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System to Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Stimulated Process, IEEE Transactions on Systems, Man, and Cybernectics, vol. SMC-16, No. 4, Jul./Aug. 1986.

Todd, Signed and Delivered: An Introduction to Security and Authentication, FInd Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, 30th Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associated, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from the Internet, URL: http//www.research.ibm.com/antivirus/scipapers.kephart/VB97, pp. 1-15.

Richardson, Enterprise Antivirus Software, Feb. 2000, Retrieved from the Internet, URL: http://www.networkmagazine.com/article/nmg20000426S0006, pp. 1-6.

Understanding and Managing Polymorphic Viruses, 1996, Symantec, The Symanec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/digpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating a new computer viruses, found on Norman's website, file://c:/documents%20and%20settings\7489\local%20settings\temporary%20internet%20files\olk, pp. 1-2, published Oct. 25, 2001, printed from website Dec. 27, 2002.

Internationl Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communication, vol. 15, No. 7, Sep. 1997, pp. 1373-1380.

INFO: Visual Basic Supports P-Code and Native Code Compilation (Q229415), http://support.microsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May. 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List. CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Release, pp. 1-4, http://216.239.39.104/search?q=cache:HS9kmK1m2QoJ:www.veritas.com/us/aboutus/pressroom/199 . . . .

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyperSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Technique, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., EMERALD: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

EMERALD TCP Statitical Analyzer 1998 Evaluation Results, http://www.sdl.sri.com/projects/emerald/98-eval-estat/index.html, Jul. 9, 1999, pp. 1-15.

Staniford-Chen, GrIDS-A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.bvte.com/art/9805/sec20/art1.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, http://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.com/support/docs.htm, Jul. 6, 2004.

Network ICE Corporation, Network ICE Press Release, p. 1, http://www.web.archive.org/web/19990903214428/www.netice.com/company/pressrelease/press.htm, Jul. 7, 2004.

Network ICE Corporation, Network ICE Press Release, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDS-A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 1999), http://www.phrack.org/show.php?p=55&a=9, pp. 1-6.

Porras et al., A Mission-Impact Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b . . . .

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.

NetScreen, Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems,SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, pp. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No. Date, pp. 1-12.

RealSecure ICEcap Manager User Guide Version 3.6, Internet Security Systems, Inc., 1998-2002, pp. 1-228.

Cuppen, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.

Perrochon et al., Event Mining with Event Processing Networks, Date Unknown, Stanford University, pp. 1-4.

Gruschke, Integrated Event Management: Event Correlation Using Dependency Graphs, presented at DSOM 1998, University of Munich, pp. 1-12.

Brass, Intrusion Detection System and Multisensor Data Fusion, Apr. 2000, Communications of the ACM, vol. 43, No. 4, pp. 99-105.

Bass et al., A Glimpse into the Future of ID, Date Unknown, Usenix, pp. 1-10.

Lapadula, State of the Art in Anomaly Detection and Reaction, Jul. 1999, Mitre Corporation, pp. 1-36.

Rationalizing Security Events with Three Dimensions of Correlation, Date Unknown, NetForensics, Tech Brief, pp. 1-6.

Jou et al., Design and Implementation of a Scalable Intrusion Detection System for the Protection of Network Infrastructure, Date Unknown, MCNC, pp. 1-15.

Caldwell, Event Correlation: Security's Holy Grail?, Aug. 1, 2002, GuardedNet, pp. 1-21.

Metcalf et al., Intrusion Detection System Requirements, Sep. 2000, Mitre Corporation, pp. 1-33.

Jou et al., Architecture Design of a Scalable Intrusion Detection System for the Emerging Network Infrastructure, Technical Report CDRL A005, Apr. 1997, MCNC, pp. 1-42.

Security Manager for UNIX Systems Version 3.2.1 User's Guide, Feb. 1998, Internet Security Systems, pp. 1-162.

RealSecure Release 1.2 for UNIX A User Guide and Reference Manual, 1997, Internet Security Systems, Inc., pp. 1-92.

Internet Scanner SAFE SAFEsuite 4.0 User Guide and Reference Manual, 1996, Internet Security Systems, Inc., pp. 1-158.

Internet Scanner 3.3 User Guide and Reference Manual, 1996, Internet Security Systems, Inc, pp. 1-119.

Landwehr et al., Newsletter of the IEEE Computer Society's TC on Security and Privacy Electronics, Electronic CIPHER, Nov. 25, 1997, Issue 25, pp. 1-34.

20th National Information Systems Security Conference, Oct. 6-10, 1997, Baltimore, Maryland, pp. 1-44.

EMERALD Alert Management Interface User's Guide Version 1.2, Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Network ICE Products—ICEcap, Date Unknown, pp. 1-2.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Administration Guide Version 3.0, 2001, Internet Security Systems Corporation, pp. 1-51.

"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.

"Real Secure™, Network Engine User Guide," Version 3.2.1, © 1999 by Internet Security Systems, Inc., pp. 1-38.

"Real Secure™, User Guide," Version 3.2.1, © 1999 by Internet Security Systems, Inc., pp. 1-38.

"Real Secure™, Manager for HP OpenView User Guide," Version 1.3, © 1999 by Internet Security Systems, Inc., pp. 1-48.

"Database Scanner, User Guide," Version 2.0, © 1992-1999, Internet Security Systems, Inc., pp. 1-112.

"Database Scanner™, User Guide," Version 4.0, © 2000 by Internet Security Systems, Inc., pp. 1-122.

"Database Scanner™, User Guide," Version 3.0.1, , © 1999 by Internet Security Systems, Inc., pp. 1-164.

"Real Secure™, Network Sensor User Guide," Version 5.0, © 2000 by Internet Security Systems, Inc., pp. 1-42.

"Real Secure, Server Sensor User Guide," Version 5.5, © Internet Security Systems, Inc., 2000, pp. 1-56.

"Internet Scanner™, User Guide," Version 6.0, Copyright © 1999 by Internet Security Systems, Inc., pp. 1-182.

"Internet Scanner™, User Guide," Version 6.1, © 2000 by Internet Security Systems, Inc., pp. 1-226.

"Internet Scanner™, User Guide," Version 5.6, © 1992-1998, Internet Security Systems, Inc., pp. 1-162.

"Internet Scanner™, User Guide," Version 5.3, © 1992-1998, Internet Security Systems, Inc., pp. 1-173.

"Real Secure, Console User Guide," Version 5.2, © 199?-2000, Internet Security Systems, Inc., pp. 1-162.

"Internet Scanner™, User Guide," Version 5.8, © 1999 by Internet Security Systems, Inc., pp. 1-148.

"SAFEsuite Decisions, User Guide," Version 1.0, © 1992-1998, Internet Security Systems, Inc., pp. 1-88.

"Real Secure™, Console User Guide," Version 5.0, © 2000 by Internet Security Systems, Inc., pp. 1-114.

"SAFEsuite DECISIONS, User Guide," Version 2.5, © 2000 by Internet Security Systems, Inc., pp. 1-194.

"System Scanner, User Guide," Version 1.7, © 1992-1998, Internet Security Systems, Inc., pp. 1-248.

"Sytem Scanner, User Guide," Version 1.0, © 1996-1998, Internet Security, Inc., pp. 1-140.

"System Scanner™, User Guide," Version 4.0, © 1999 by Internet Security Systems, Inc., pp. 1-178.

Internet Security Systems, Inc., "Introduction to RealSecure Version 5.0, The Industry's Only Integrated Host-Based and Network-Based Intrusion Detection System", Aug. 22, 2000, pp. 1-47.

Internet Security Systems, Inc., "RealSecure Network Sensor and Gigabit Network Sensor Policy Guide Version 7.0", Aug. 2003, pp. 1-86.

Internet Security Systems, Inc., "RealSecure Console User Guide Version 3.1", Jun. 1999, pp. 1-98.

Internet Security Systems, Inc., "RealSecure Version 2.0", Apr. 1998, pp. 1-154.

Internet Security Systems, Inc., "Enhanced Dynamic Threat Protection via Automated Correlation and Analysis", an ISS White Paper, 2002, pp. 1-14.

Internet Security Systems, Inc., "RealSecure Site Protector Comparison Guide for Internet Scanner 7.0 Reporting Version 1.2", Mar. 2003, as ISS Tech Note, pp. 1-15.

Internet Security Systems, Inc., "RealSecure Site Protector Comparison Guide for ICEcap Manager Version 1.5", Jan. 2002, as ISS Technical White Paper, pp. 1-27.

Internet Security Systems, Inc., "RealSecure SiteProtector Security Fusion Module 2.0 Frequently Asked Questions", Mar. 2003, pp. 1-8.

Internet Security Systems, Inc., "RealSecure SiteProtector Console User Reference Guide Version 2.0 Service Pack 1", Mar. 14, 2003, Chapter 3, pp. 1-27.

Internet Security Systems, Inc., "Proventia Gateway and Network Protection", Jul. 2003, pp. 1-12.

Farley, Internet Security System, Inc., "ID Fusion Technology, A First-Generation Approach", Apr. 29, 1999, National Security Framework Forum, pp. 1-8.

Farley, "RealSecure Fusion Engine Concepts", an ISS White Paper, Jun. 30, 1999, pp. 1-23.

* cited by examiner

METHOD AND APPARATUS FOR NETWORK ASSESSMENT AND AUTHENTICATION

FIELD OF THE INVENTION

The present invention relates to network security for distributed computer systems and, more specifically, to granting network services and determining the level of supplied services based upon an assessment of the vulnerability of a network computer.

BACKGROUND OF THE INVENTION

As use of network services becomes more prevalent in distributed computer networks, secure authentication of a computer user increases in importance. Authentication is required to prevent unauthorized use and abuse of network services. Authentication services typically require the user to verify his or her identity to the network service provider to determine whether that user is authorized to use a computer to access the network.

An authorization mechanism defines who is allowed to do what on a computer. Two computer authorization mechanisms for typical operating systems are privileges and object access control. Users granted a specific privilege can perform an action that is denied to users who do not have the privilege. Typically, privileges are not evaluated on a per-object basis. Instead, a privilege is applied in general to an action for a user. For example, the root user in most UNIX operating systems has a set of privileges associated with authorized actions. The "WINDOWS NT" operating system supports the grant of a set of privileges on a per-user or user group basis.

When access control is required for a particular object, such as a file, a form of authorization other than a general privilege can be used to define a permission to access the object on a per user basis. Object access control can specify, for each object, different access permissions for different users. For example, on a UNIX system, the "chmod" command allows the user to specify read, write, and execute permissions for the owner, the group, and the world. The "WINDOWS NT" operating system uses a discretionary access list that grants control permissions for different users.

Both authorization methods support the control of computer actions based on the identity of the user. The user's identity establishes the privileges and the objects that she can access via a computer. Establishing the identity of the user is crucial to security and control in a computer network and is the role of the authentication process.

There are three branches of authentication technology in common use today to assist verification of the identity of the user. Shared secret (password) technology is one; public key technology is a second; and biometric technology is a third. Conventional authentication involves confirming the user's identity by (1) verifying a shared secret, such as a password, (2) using public/private key encryption and verifying that the user knows the private key, or (3) using unique biometric information about the user, such as fingerprints, retinal patterns, or voice prints. All three technologies revolve around the fundamental principle of credentials. A credential is information useful to establish the identity of a computer user. An authenticating service requests credentials from the user to support a decision about the identity of the user based on the credentials.

In many organizations and homes today, users operate a workstation, which makes requests for a network service available on a computer network. The workstation is important in authentication for two reasons. First, the workstation is a platform from which the user can access resources, including network services, on the network. Users authenticate and connect to network services from their workstations. Second, the workstation can be silently compromised by an unauthorized party. A "silent" compromise is one that the user cannot easily detect without the aid of external security auditing tools. Silent compromise is typically accomplished by installing a compromise tool called a "root kit" or a "backdoor" on the workstation. For example, current "hacker" software can be used to obtain the customer's password by logging keystrokes or browser screenshots can be taken to intercept SSL-protected HTTP traffic.

An intruder may compromise the integrity of a workstation, or a workstation may be misconfigured so that compromise is possible. The use of a network service may be compromised when a user accesses a network service from a compromised workstation. This subjects the network service to unauthorized use and abuse by the intruder on a valid user's workstation.

The effect of a compromised workstation is the potential violation of security mechanism that assumes the workstation is "trusted", including password-based authentication and some forms of biometric authentication. Smart card authentication implementations also can be subverted if the workstation's Trusted Computer Base is subverted. For example, a user's credentials, such as password and biometric credentials, can be stolen or rogue code can be executed that impersonates the logged-on user.

Host assessment and authentication is relevant to the Internet environment because most Web clients are currently desktop machines. These machines are capable of being compromised, and are frequent targets of compromising attacks. Some Web sites attempt to verify the security of the client host by performing a security assessment before allowing transactions from that host.

For example, online banking applications are typically implemented by Web sites that allow customers to view account balances and pay bills. Customers and insurers want assurances that only the customer can perform transactions, and that the transactions are confidential. Current techniques include password authentication to verify that only the customer has access to their account, and SSL or PCT encryption to verify that there is no "man in the middle" capable of intercepting the network traffic.

In view of the foregoing, there is a need for a way for verifying the integrity of the workstation prior to granting access to and determining the level of a network service. The present invention solves the security compromise problem by providing assurances to the Web site operator (and their insurer) that the user's workstation has not been compromised or is easily compromised. The invention can accomplish this desirable objective by scanning the user's workstation for evidence of compromise and vulnerabilities that could lead to compromise. For example, when a user signs on to a Web site, the scan can be completed as part of the authentication process.

SUMMARY OF THE INVENTION

The disadvantages of the prior art are overcome by the present invention, which can restrict access to a network service based on information about the integrity and security posture of the workstation that originates the service request. A network service receives a request for service from a user on a workstation. Prior to authorizing access to the service, the network service requests or expects to receive credentials from the user and/or the workstation. Workstation credentials are presented as part of the authentication process, and typically include information about the current integrity of the workstation, and the security posture of the workstation. The security posture typically includes data that indicates the potential for the workstation to be compromised. The network service makes a decision about whether to process the service request based on the user credentials and/or the workstation credentials. If the network service decides to process the request, it may elect, based on the workstation credentials, to provide a degraded service that is consistent with the perceived risk of workstation compromise.

The present invention provides an authentication process that can refuse access by a workstation to a network service based on the integrity and security posture of the workstation that originates the service request. This inventive process can be integrated with other authentication processes, particularly user authentication processes, to enhance the security provided by the authentication process. This augments the authentication and authorization processes of existing network services.

The present invention can also perform workstation assessments from multiple security perspectives, store the different results, use the assessments to grant or deny service access, and issue a report of these results to authorized users. The term "multiple security perspectives" means that workstation assessments may be performed at different network locations, and with different levels of access to the workstation by a workstation assessment service.

More particularly described, the present invention provides a network authentication system comprising an assessment service for assessing the vulnerability of a workstation that can be connected to a network server. The network server provides network service(s) over a computer network and requires authentication to maintain secure operations. A workstation is assessed, either locally or over the network, for security vulnerabilities. A workstation assessment service produces workstation credentials comprising integrity information and security posture information. Integrity information describes whether the workstation is compromised, while security posture information describes the workstation's potential for compromise, or security risk. The results of an assessment are compared to a workstation security policy to decide whether to allow network service and to define a level of network service to be supplied to the workstation.

The workstation assessment service can be located on the workstation, thereby providing a local workstation assessment service. In the alternative, the workstation assessment service can operate on a network machine other than the workstation, thereby providing a network-based workstation assessment service. The network service, upon receiving the service request from a network client operating on a workstation, requests workstation credentials from a local workstation assessment service on the requesting workstation or via the network-based workstation assessment service. The network service can use a persistent store to cache workstation credentials and thereby prevent overly frequent reassessments of the workstation.

The workstation policy can be stored on a network server that hosts the network service. In the alternative, the workstation policy can be stored on a network server that is different from the server that hosts the network service. The workstation policy also can be stored on the workstation.

Typical distributed computing environment includes a workstation and a network server, each coupled to a computer network. A network client operates on the workstation, whereas a network service operates on the network server. For a representative scenario, the network service can request workstation credentials from a local workstation assessment service operating on the workstation. In turn, a network client, as part of the network client authentication process, can transmit the workstation credentials to the network service. The network service processes the workstation credentials based on workstation policy and decides whether to allow service to the network client.

For another aspect, the network service requests workstation credentials from a network-based workstation assessment service. In response, the network workstation assessment service provides workstation credentials to the network service to support the authentication process. The network service processes the workstation credentials and workstation policy to determine whether to allow service to a network client operating on the workstation.

For yet another aspect, the network service can transmit a security challenge to the network client. In response, the workstation assessment service transmits a reply that allows the network service to verify that the workstation assessment service has completed an assessment. This challenge/response may be implemented by the transmission of a shared secret, such as a pseudo-random number. The response may be generated by a one-way-function (such as MD5 or SHA1) performed on a concatenation of the challenge, the shared secret, and the results of the workstation assessment. The network service verifies that a program with knowledge of the shared secret produced the results of the workstation assessment. The network service can "trust" the results of a workstation assessment based on a positive verification result.

The network service may utilize the results of the workstation assessment to provide a degraded level of service to the workstation. The service level corresponds with the results in the workstation assessment result set. The level of service can be driven by a metric, such as a scalar score calculated by assigning a weight to each possible result, adding the weights for each result in the workstation assessment result set, and providing a score threshold for each possible level of service. If a score exceeds the score threshold for a particular level of service, then that level of service may not be granted by the network service. In the alternative, a scalar score can be calculated based upon a weighted average of a vulnerability for a workstation, each vulnerability assigned a predetermined priority. Consequently, the level of service can be associated with any conventional metric.

The service level also can be decided by utilizing techniques, such as artificial intelligence or expert systems, to make an intelligent analysis of the risk involved to the network service, service provider, and end user, given the workstation assessment results. For example, if a network service provides a service in distinct facets, each service facet may make a determination about degree of service provided, utilizing the results of the workstation assessment. When a network service provides data transport for network services, each higher-level network service may make a determination about the service level to be provided, utilizing the results of the workstation assessment, as provided by the data transport service.

In view of the foregoing, it will be understood that the present invention can grant access to the network services and determine the level of supplied services based upon an assessment of the vulnerability of a workstation coupled to a computer network. The advantages and implementation of the present invention will be described in more detail below in connection with the detailed description, the drawing set, and the attached claims.

DETAILED DESCRIPTION OF THE EXEMPLARY EMBODIMENTS

Figure 1:
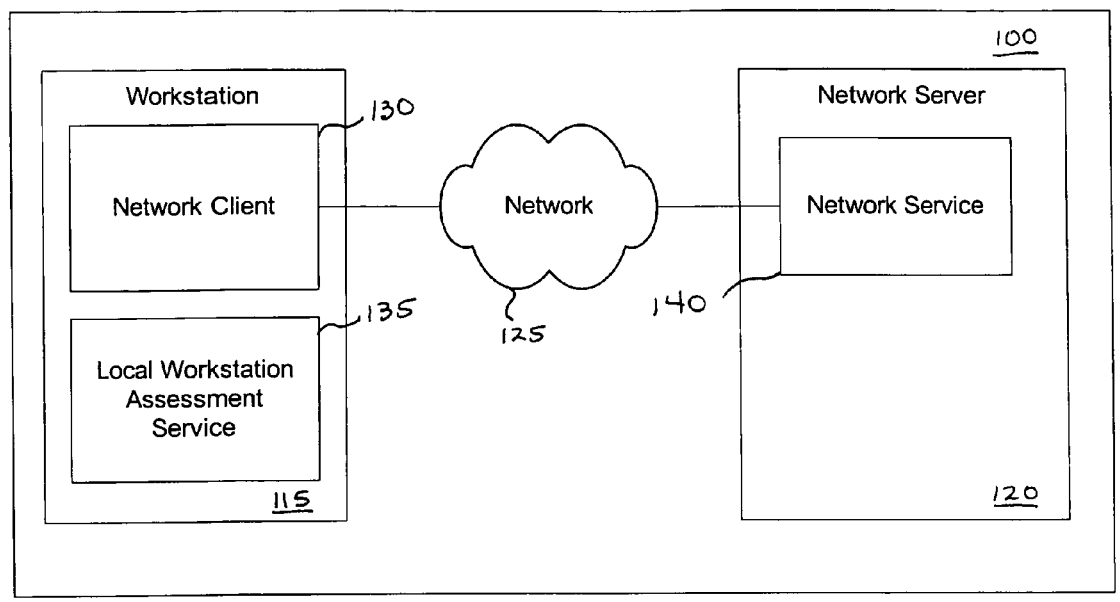
FIG. 1 is a block diagram illustrating the primary components of a network security system, including a local workstation assessment service on a workstation, in accordance with an exemplary embodiment of the present invention.

In environments where computers are shared, users want an assurance that the computer they are logging-in to is secure, before completion of the log-in operation. This can be accomplished by extending the local log-in process to perform a local host assessment of the workstation prior to requesting the user's credentials. If the assessment finds a vulnerability, the log-in process can inform the user that the machine is or may be compromised, or repair an identified vulnerability, prior to completion of the log-in operation.

By performing vulnerability assessment at the level of the workstation, the network server is able to determine whether the workstation is a "trusted" platform from which to accept authentication requests. If the vulnerability assessment shows that the computer is compromised, or if the possibility of remote compromise is high, the network server can deny authentication because the workstation cannot be trusted. Optionally, a vulnerability assessment tool may be able to repair the vulnerability of the workstation, thereby allowing the authentication to proceed.

For example, corporations that implement Virtual Private Networks (VPNs) typically allow people physically located outside corporate facilities access to the corporate network. While corporate computer systems staff can secure the machines physically located in corporate facilities, they cannot control machines located outside corporate boundaries. These external machines present a security risk. Even if the users of the external machines are benevolent, the machines may have been compromised silently. If this happens, the intruder on the external machine may use the VPN connection as a stepping-stone to unauthorized use of the corporate network. This risk can be addressed by extending the log-in process to include vulnerability assessment of the external host. If the vulnerability assessment fails, the external host is not allowed to connect to the network and the user of the external host is notified of the security risk. Another alternative is to automatically address the vulnerability (with the user's approval) by repairing an identified vulnerability, prior to completing the VPN log-in process. This technology can also be used to secure dial-up networking. The dial-up networking authentication process can be extended to include vulnerability assessment of the dial-in host.

As used in the description herein and throughout the claims, the following terms take the meanings explicitly associated herein, unless the context clearly dictates otherwise: the meaning of "a", "an", and "the" includes plural references, the meaning of "in" includes "in" and "on." Also, as used herein, "global computer network" includes the Internet. A "network service" includes any service that is made available over a distributed computer network. Exemplary embodiments of the invention are now described in detail in connection with the drawings. Referring to the drawings, like numbers indicate like parts throughout the views.

Figure 2:
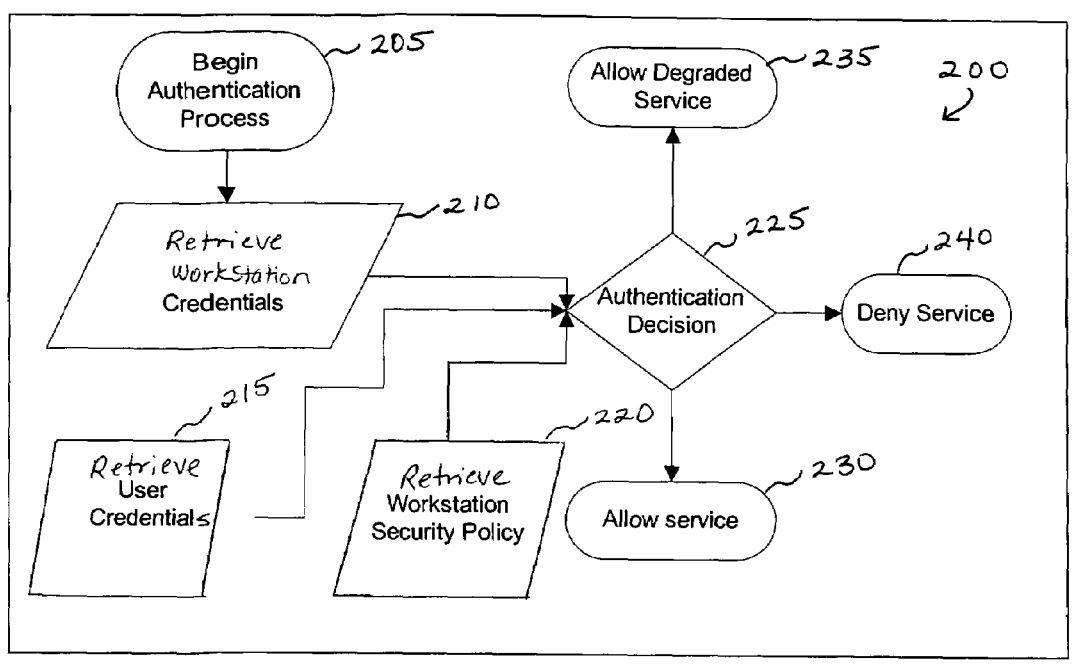
FIG. 2 is a logical flowchart diagram illustrating an authentication process in accordance with an exemplary embodiment of the present invention.

FIGS. 1 and 2 illustrate a client-invoked vulnerability assessment of a workstation in which the workstation credentials are generated locally at the workstation. In other words, the vulnerability assessment is invoked at the client and the assessment is completed by a local workstation assessment service on the workstation. As shown in FIG. 1, an exemplary network security system 100 comprises a workstation 115 operating a local workstation assessment service in a network environment including a distributed computer network 125 and a network server 120. A network client 130 retrieves workstation credentials, typically including workstation integrity information and workstation security posture information, from the local workstation assessment service 135 on the workstation 115. The local workstation assessment service 135 generates the workstation credentials by completing a local examination of the workstation 115. The network client 130, which also resides on the workstation 115, presents these credentials to a network service 140 on the network server 120 during an authentication process. The network service 140 decides whether to provide service to the workstation 115 via the network 125 based on the workstation credentials. Specifically, the network service 140 completes this decision-making process by evaluating the workstation against a workstation security policy. This allows the network service 140 to determine the extent to which the workstation 115 complies with its security policy. The network service 140 typically uses a policy compliance measurement to decide what, if any, service level to be the supplied to the workstation 115.

Turning now to FIG. 2, a logical flowchart diagram presents an illustration of the sequence of exemplary steps completed by an authentication process in connection with the local workstation assessment service in FIG. 1. The authentication process is invoked at the client and the assessment is completed by the local workstation assessment service residing on the workstation. The exemplary authentication process 200 begins in step 205 in response to a user initiating a log-in operation on a workstation coupled to a computer network. The workstation includes a local workstation assessment service maintained in memory to support the local generation of workstation credentials. The local workstation assessment service can generate the workstation credentials by completing vulnerability assessment of the workstation. In step 210, a network client residing on the workstation retrieves the workstation credentials from the local workstation assessment service. In addition, the network client can obtain user credentials in step 215 from a user credential database. The network client can provide both the workstation credentials and the user credentials to a network service via a computer network. The network service operates on a network server and is operative to determine whether to provide service to a workstation coupled to the computer network based upon workstation credentials. In step 220, the network service accesses a workstation security policy to support a determination of whether to provide service to the requesting workstation. In a separate decision-making process, the user credentials can be compared to a user credential database to further support secure computing operations.

The network service completes an authentication decision in step 225 by applying the workstation credentials to the workstation security policy. In the event that the credentials satisfy the workstation security policy, the network service permits operation of the requested service by the workstation in step 230. If the credentials satisfy only a portion of the workstation security policy, the network service can elect to allow the workstation to access a degraded level of service, as shown in step 235. On the other hand, the network service can elect to deny service to the workstation, as shown in step 240.

Figure 3:
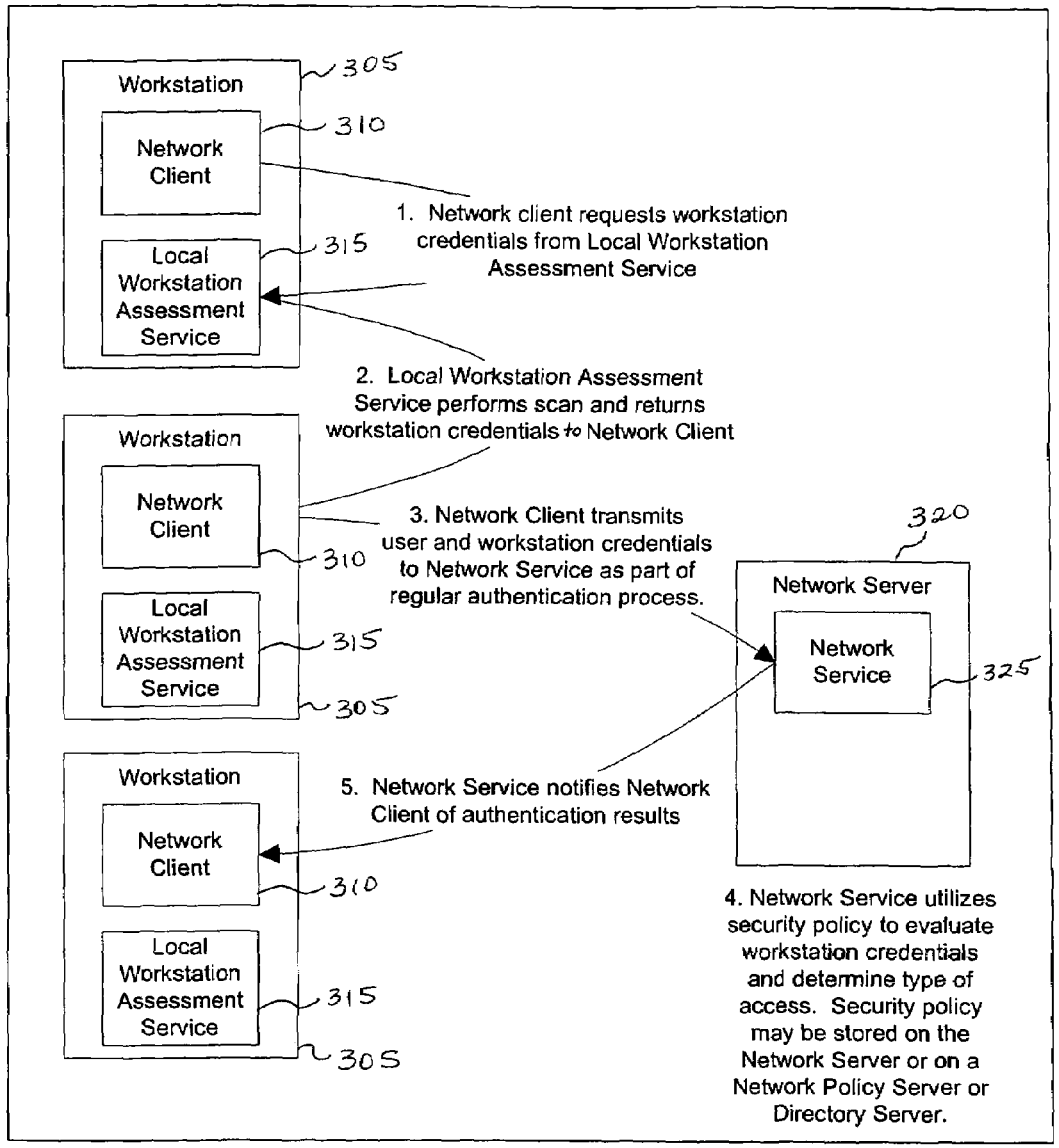
FIG. 3 is a diagram showing interactions between a workstation having a local workstation assessment service and a network server having a network service in accordance with an alternative embodiment of the present invention.

FIG. 3 provides an illustration of another alternative exemplary network security system for a computer network comprising one or more workstations and a network server. Similar to FIGS. 1 and 2, FIG. 3 illustrates a client-invoked vulnerability assessment with a local assessment of the workstation. A workstation 305 comprises a network client 310 and a local workstation assessment service 315. The network server 320 maintains one or more network services 325. Each workstation 305 can access the network service 325 via a distributed computer network. Prior to a service request, the network client 310 issues a request for workstation credentials to initiate an authentication process. In response, the local workstation assessment service 315 completes the vulnerability assessment of the workstation 305 and returns workstation credentials to the network client 310. In this manner, the workstation assessment is completed by a local assessment service operating on the host computer rather than by a server-based assessment service operable to complete a remote scan of the workstation.

The network client 310 can transmit the workstation credentials and/or user credentials to the network service 325 via the distributed computer network. A typical authentication process is completed by evaluating credentials for a workstation. The network service 325 accesses a workstation security policy to evaluate the workstation credentials and to determine the level of service, if any, to be provided to the workstation 305. The workstation security policy can be maintained on the network server 320 or on a separate server, such as a network policy server or a directory server. The network service 325 can determine whether to allow the workstation 305 to access a network service based upon a comparison of the workstation security policy to the workstation credentials. The network service 325 notifies the network client 310 of the authentication results generated by a comparison of the workstation security policy to the workstation credentials. Although the exemplary network security system 300 completes a local assessment of the host computer, the authentication decision is completed by a separate computer on the distributed computer network, namely the network server 320.

Figure 4:
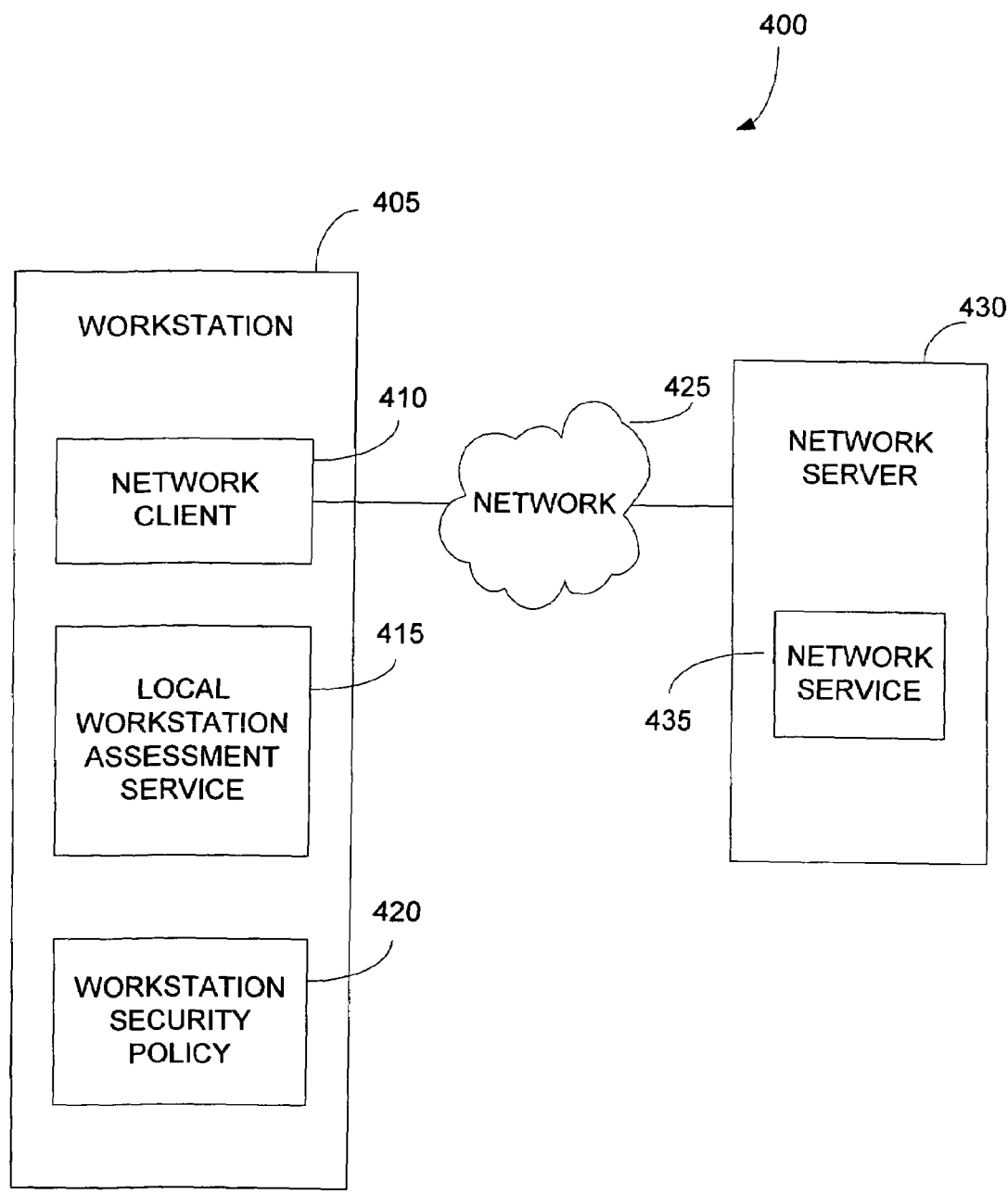
FIG. 4 is a diagram illustrating a network security system including a workstation having a local workstation assessment service and a workstation security policy for completing a local authentication decision in accordance with an exemplary embodiment of the present invention.

FIG. 4 illustrates an exemplary network security system 400 that makes a local authentication decision based on a vulnerability analysis completed on the host workstation. The network security system 400 operates in a traditional client-server environment to support the delivery of network services to a client via a remote server. The client invokes the vulnerability assessment, which results in a local assessment of the workstation to support an authentication decision at the client workstation. A workstation 405 has a local workstation assessment service 415 and a workstation security policy 420. The workstation 405 further includes a network client 410, which can be connected a network 425, such as the global Internet. A network server operating a network service 435 is also connected the network 425.

The network client 410 queries the local workstation assessment service 415 for workstation credentials. The network client 410 completes a policy compliance measurement by using the workstation security policy 420 and the workstation credentials. The network client 410 can then decide whether to use traditional user authentication with the network service 435. Other options include storing the workstation policy on a separate server and caching the workstation credentials on the network server. In this manner, there is no requirement to assess the workstation for each service request.

Figure 5:
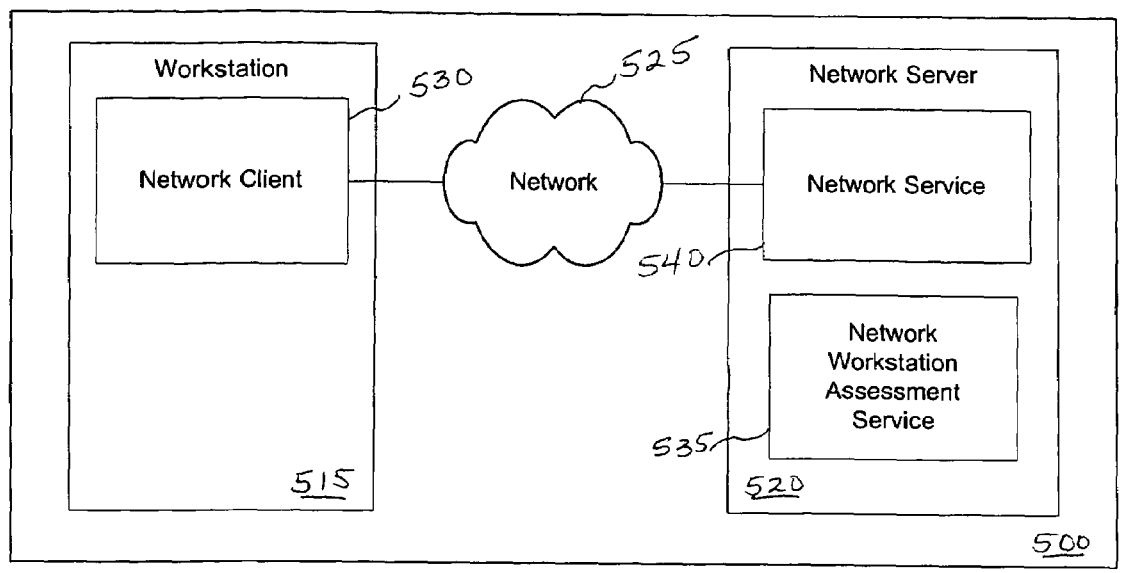
FIG. 5 is a block diagram illustrating the primary components of a security system including a workstation assessment service co-located with a network service in accordance with an exemplary embodiment of the present invention.

FIG. 5 illustrates an alternative exemplary network security system 500 for network service authentication comprising a network workstation assessment service resident at a network server. The architecture of the exemplary network security system of FIG. 5 is based upon a vulnerability assessment invoked by a network service and an assessment completed at the network server rather than at the local workstation. In contrast, the workstation assessment service operates on the host or local workstation in the exemplary network security system 100 of FIG. 1. Turning now to FIG. 5, a network client 530, operating on a workstation 515, presents user credentials and a request for service to a network server 520 via a distributed computer network 525. A network service 540, resident on the network server 520, requests workstation credentials from a network workstation assessment service 535. This service may reside on the network server 520, as shown in FIG. 5, or on another server (not shown) connected to the network 525. The network workstation assessment service 535 generates the workstation credentials by remotely examining the workstation 515 for actual or potential vulnerabilities to security violations. In turn, the network service 540 can evaluate the workstation 515 by comparing the workstation credentials against a workstation security policy. Based upon this evaluation, the network service 540 will determine the level of service, if any, to be provided via the network 525 to the workstation 515. For example, if the network service 540 decides to allow service to the workstation 515, the network server 520 delivers the service via the network 525 for use by the network client 530.

Figure 6:
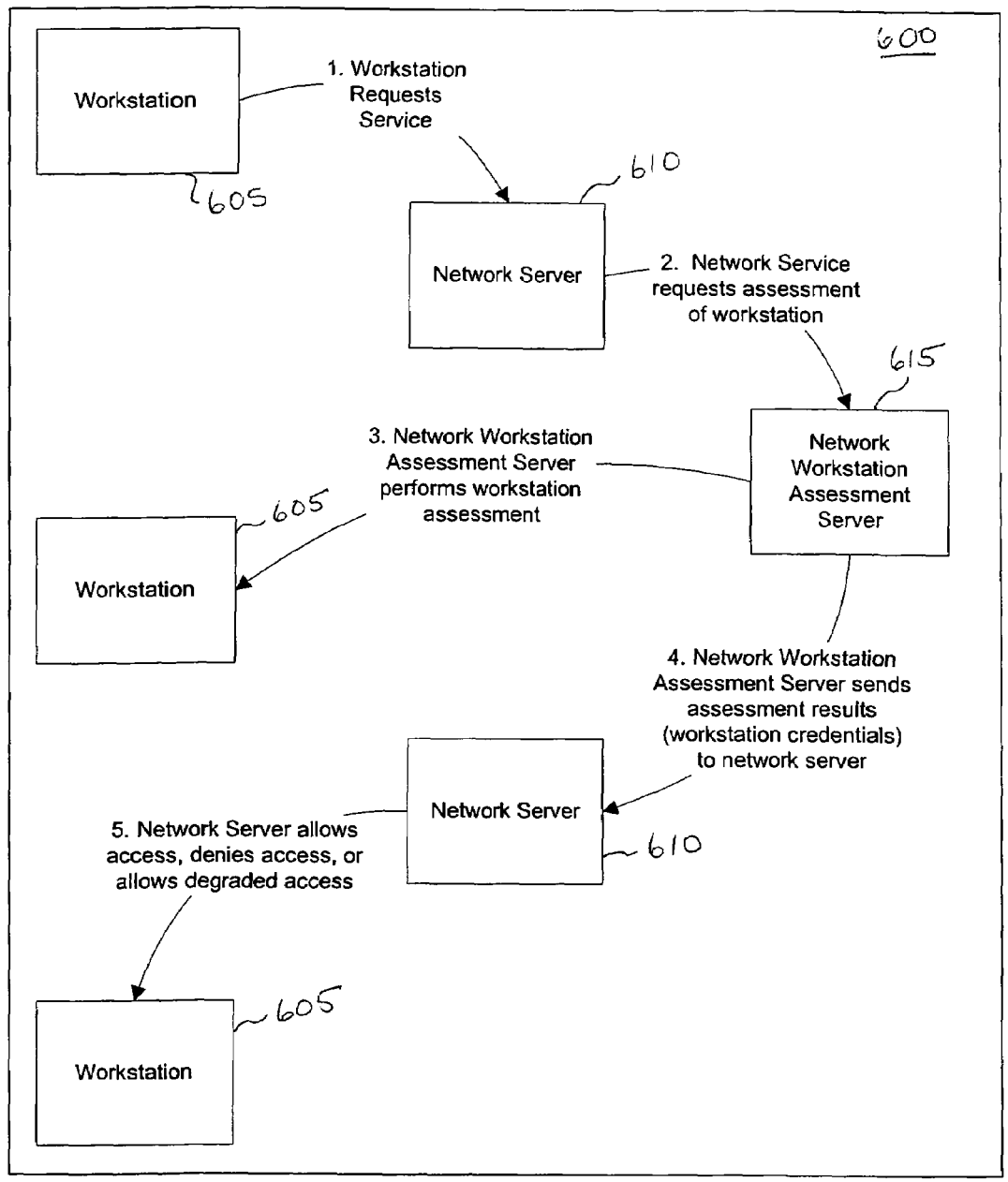
FIG. 6 is a diagram showing interactions between a workstation, network server, and network workstation assessment server of a network security system in accordance with an exemplary embodiment of the present invention.

An alternative exemplary network security system is shown in FIG. 6. The exemplary network security system supports a network service-invoked vulnerability assessment of a client workstation where the network workstation assessment service is operating on a server other than the network server providing the network service. Turning now to FIG. 6, the exemplary network security system 600 comprises a workstation 605, a network server 610, and a network workstation assessment server 615, each connected to a distributed computer network, such as the global Internet or an intranet. To obtain a service from the network server 610, a workstation 605 issues a request for service to the network server 610 via the distributed computer network. In response, a network service operating on the network server 610 issues a request for a workstation assessment. The network workstation assessment server 615 responds to the workstation assessment request by remotely completing a workstation assessment of the workstation 605 via the distributed computer network. The workstation assessment comprises a scan of the workstation 605 to identify possible security vulnerabilities of that computer and generates security credentials for the workstation 605. The network workstation assessment server 615 can send the workstation credentials to the network server 610 via the distributed computer network. In turn, the network server 610 compares the workstation credentials to a workstation security policy and decides whether to allow the workstation 605 to access the service available on the network server.

The exemplary network security system illustrated in FIG. 6 is similar to the network security system shown in FIG. 5, with the exception that the network workstation assessment service is operating on a server other than the network server providing a network service. In other words, the network server 610 in FIG. 6 is not responsible for completing an assessment of the potential vulnerabilities of the workstation requesting access to network service. Instead, the network server 610 relies upon a workstation assessment service operating on a separate server, the network workstation assessment server 615, to complete a remote scan of the workstation 605 via the distributed computer network. The network service operating on the network server 610 uses the scan results provided by the network workstation assessment server 615 to determine whether to provide a particular service level to the requesting workstation 605.

Figure 7:
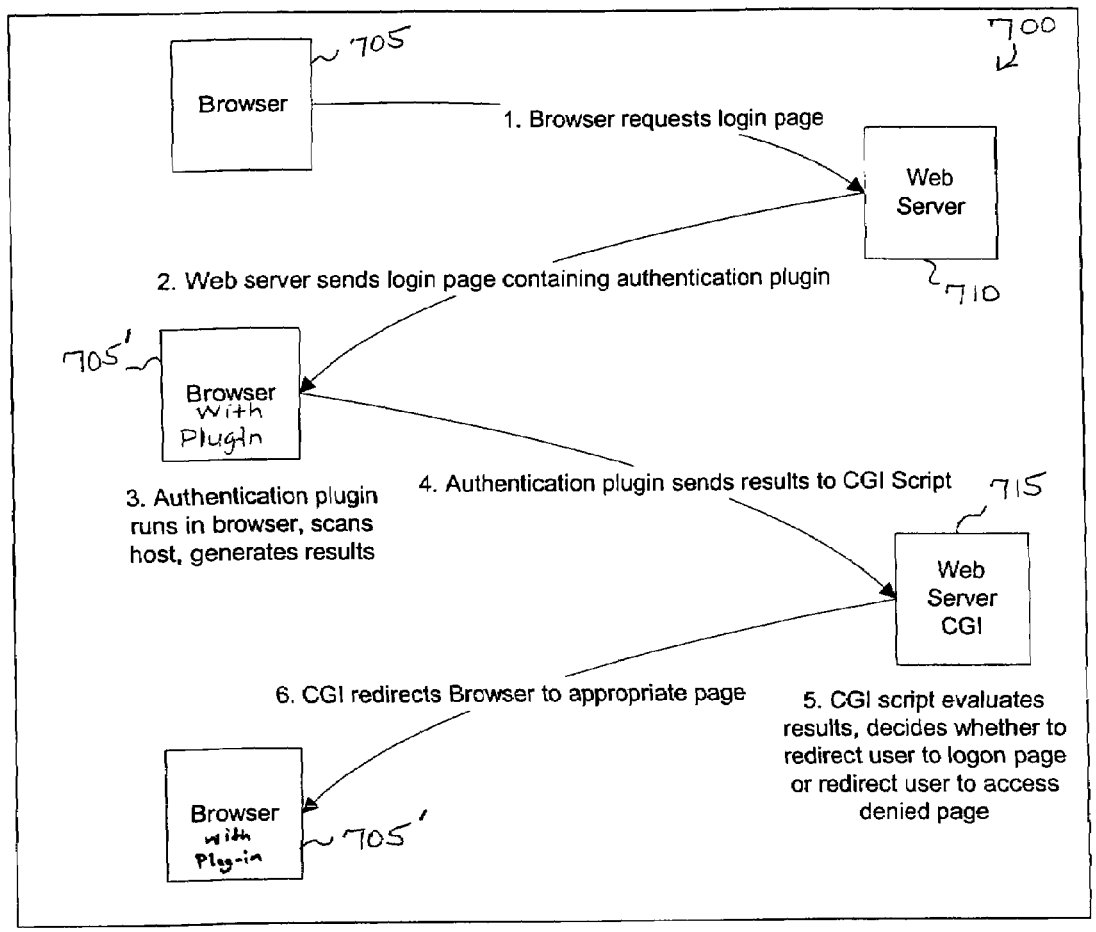
FIG. 7 is a diagram showing interactions between a browser and a Web server in a Web-based security system in accordance with an exemplary embodiment of the present invention.

An exemplary process 700 for Web-based network service authentication relying upon browser-based technology is shown in FIG. 7. Turning to FIG. 7, the process 700 is initiated by a browser 705, which operates on a workstation, requesting a log-in page from a Web server 710 via a distributed computer network, such as the Internet. The Web server 710 provides a service that requires authentication and log-in of a requesting workstation. The Web server 710 transmits a workstation assessment agent, which may be a Java applet, ActiveX control, browser plug-in, or other Web-based executable content, to the Web browser 705 in response to the log-in-request. Once installed at the browser 705, the workstation assessment agent generates workstation credentials based on a local examination of the workstation. For example, if the workstation assessment agent is implemented as a browser plug-in, the plug-in operates within the browser environment to complete a scan of the host computer. The results of this vulnerability scan represent workstation credentials. For the representative example shown in FIG. 7, the workstation assessment agent is implemented by a browser plug-in 705'.

The workstation assessment agent, i.e., the browser plug-in 705', transmits the workstation credentials to the Web server 710 via the computer network. An application on the Web server 710, typically a Web server CGI 715, compares the workstation credentials to a workstation security policy to decide whether the workstation is secure. Service by the Web server 710 is allowed if the Web server CGI 710 determines that the workstation is secure and the Web server 710 authenticates the user. If the Web server CGI 715 decides to continue, and the Web server 710 has not already authenticated the user, the server may now begin the user authentication process. There is a benefit to authenticating the user after completing a vulnerability analysis of the workstation—it is more difficult for an intruder to steal a user's credentials if the intrusion is detected and the user authentication process is terminated before the user presents their credentials.

Table I provides an overview of the primary network service authentication tasks completed for the Web-based operating environment of a workstation assessment agent operating on a workstation and a Web server, as shown in FIG. 7. The workstation assessment agent completes vulnerability assessment tasks and transmits the assessment results to the Web server. In turn, the Web server determines whether to provide a network service to the workstation based on the assessment results.

TABLE I

| | |
|---|---|
| 1. | The user of a workstation requests a log-in page from a Web server, typically by clicking a button or link on a Web page to begin the authentication process. |
| 2. | A browser, operating at the workstation, loads a host authentication page. The host authentication page contains a browser plug-in representing a workstation assessment agent. |
| 3. | The browser plug-in performs a host assessment scan of the workstation. |
| 4. | The browser plug-in sends the scan results via a secure link to a CGI script on the Web server. |
| 5. | The CGI script uses the scan results to decide whether to grant the host access to a network service at the Web server. |
| 6. | If the host is granted access, the CGI script redirects the browser to the next step in the authentication process, namely user authentication. If the host is denied access, the CGI script redirects the browser to a page that explains why the host cannot be granted access to the Web server. This page also describes what the user can do to bring the host into compliance so that access will be granted. |

The exemplary Web-based process shown in FIG. 7 is supported by two separate components: (1) the browser plug-in 705' that performs the workstation assessment; and (2) the CGI script 715, which evaluates the scan assessment results and determines whether the host satisfies authentication requirements. The browser plug-in and the CGI script are representative embodiments of software routines that operate on the workstation and the Web server, respectively. The workstation assessment service is provided by the browser plug-in and implemented by a variety of different software routines, including a Java applet or an ActiveX control. Likewise, the network service implemented by the CGI script can be implemented by other conventional Web-based executable software programs. Consequently, it will be understood that the present invention is not limited to a particular Web-based implementation, such as the representative exemplary embodiment illustrated in FIG. 7.

The workstation assessment agent, implemented as a browser plug-in 705', has two main functions: host assessment and communication of workstation assessment results. The host assessment is completed to determine whether the host is compromised. The browser plug-in 705' runs a series of checks, each looking for a particular security risk. Each check generates a scan result, which indicates whether a vulnerability risk is present at the workstation. The browser plug-in 705' then prepares assessment results for transmission to the Web server.

The browser plug-in 705' communicates the assessment results to the CGI script 715 operating on the Web server 710. This communication is preferably completed in a secure manner, between the workstation and the Web server, so that results cannot be intercepted by a third party. The communication also should be secure in such a way as to prevent the transmission of false information to the CGI script 715. This can be accomplished by the use of authentication or encryption technologies For example, the communication between the browser plug-in 705' and the CGI script 715 can be completed by sending an HTTPS GET request with vulnerability assessment results stored as parameters of the GET request. The browser plug-in 705' generates a URL that uses HTTPS for confidentiality and contains the scan results as parameters. These parameters can be obfuscated by using shared secret encryption to prevent reverse engineering of the communications channel and to insure transmission only to appropriate servers.

The CGI script 715 receives scan results from Web clients, and decides, based on the results, whether to continue the authentication process. The script 715 responds to the scan results by redirecting the Web client, i.e., the workstation, to one of two different Web pages based on this decision. If the script 715 decides to allow authentication to continue, it redirects the browser 705 to a page that continues or completes the log-on process. If the script 715 decides to deny access, it redirects the browser 705 to a page that explains that service access is denied, why access is denied, and what can be done to obtain access to the requested service.

The CGI script 715 is preferably capable of receiving encrypted data comprising scan results from the browser plug-in 705', decrypting the data, and making a decision based on the results. The script 715 can assign a score to each different vulnerability identified by the browser plug-in 705'. When all results are received from the browser plug-in 705', the script 715 calculates a total score by adding the score assigned to each vulnerability. The total score is then compared by the script 715 against a maximum allowable score. If the total score is less than or equal to the maximum allowable score, authentication is allowed to proceed. If the total score is greater than the maximum allowable score, access by the browser 705 to the Web server 710 is denied by the script 715.

The Web-based design illustrated in FIG. 7 requires the server to decide, based on security assessment information from the client, whether or not to grant access, or possibly grant restricted access to a client workstation. In the alternative, the client can make that decision, given sufficient decision-making information from the server. For example, a browser operating on a workstation can issue a request for a log-in page to a network server. In response, the network server can transmit the log-in page, an authentication plug-in, and a workstation policy to the workstation via the computer network. The authentication plug-in is installable within the browser and operative to generate workstation security credentials by completing a vulnerability assessment of the workstation to identify security vulnerabilities that would compromise the secure operation of the workstation on the computer network. The workstation security credentials can be compared to the workstation policy on the workstation to determine whether the workstation should be granted access to a software service of the network.

In most web service contexts, the result of a decision-making process for determining whether to grant access by a client to a network service can be expressed as making a choice between URL's. If the decision comes out one way, the browser points to one URL. If it comes out another way, the browser points to a different URL. This can be accomplished on the server side by instructing the client to submit scan information to the server, and having the server redirect the client to the appropriate URL after making the service access decision.

The client's decision-making procedure typically involves three types of information: vulnerability weights, used to calculate a host score based on found vulnerabilities, a "max score", used to gate service, and two URLs, one for passing scores and one for failing scores. If the host's score exceeds the max score, the host is not granted access, and is redirected to the URL for failing scores. If the host's score is less than or equal to the max score, the host is allowed access, and is redirected to the URL for passing scores.

A network server can send vulnerability weights, max score, and URLs to the client, thereby allowing the client to calculate the host score, compare it to the max score, and redirect the browser to the appropriate URL. This delivery of information to the client via the computer network can be completed without compromising the consumer's privacy. However, if the URLs are transmitted to the client without protection, the consumer could intercept the transmitted URL and thereby circumvent the process.

By authenticating the control or plug-in transmitted to the web server, a verification can be completed so that only the control (or someone who knows the shared secret embedded within it) can request the "success" URL successfully. Assume that the "success" URL is actually the URL of a web script and that a crypto "challenge" is generated and passed to the control along with the URLs. The control can use this challenge, along with a shared secret known only to the control and the "success" URL web script, to generate a crypto "response".

Instead of redirecting the browser directly to the web script, the control can redirect the browser to the web script and pass the crypto "response" to the script (typically by simply appending it to the end of the URL). If the crypto "response" does not match the crypto "challenge" that was sent to the control, the script could redirect the browser to the "failure" URL. This way, only those with knowledge of the shared secret (preferably only the control) can request the "success" URL and gain access. This client-based design requires the control to make the network service access decision, instead of sending information from the browser-based control to support a decision by the web server.

Figure 8:
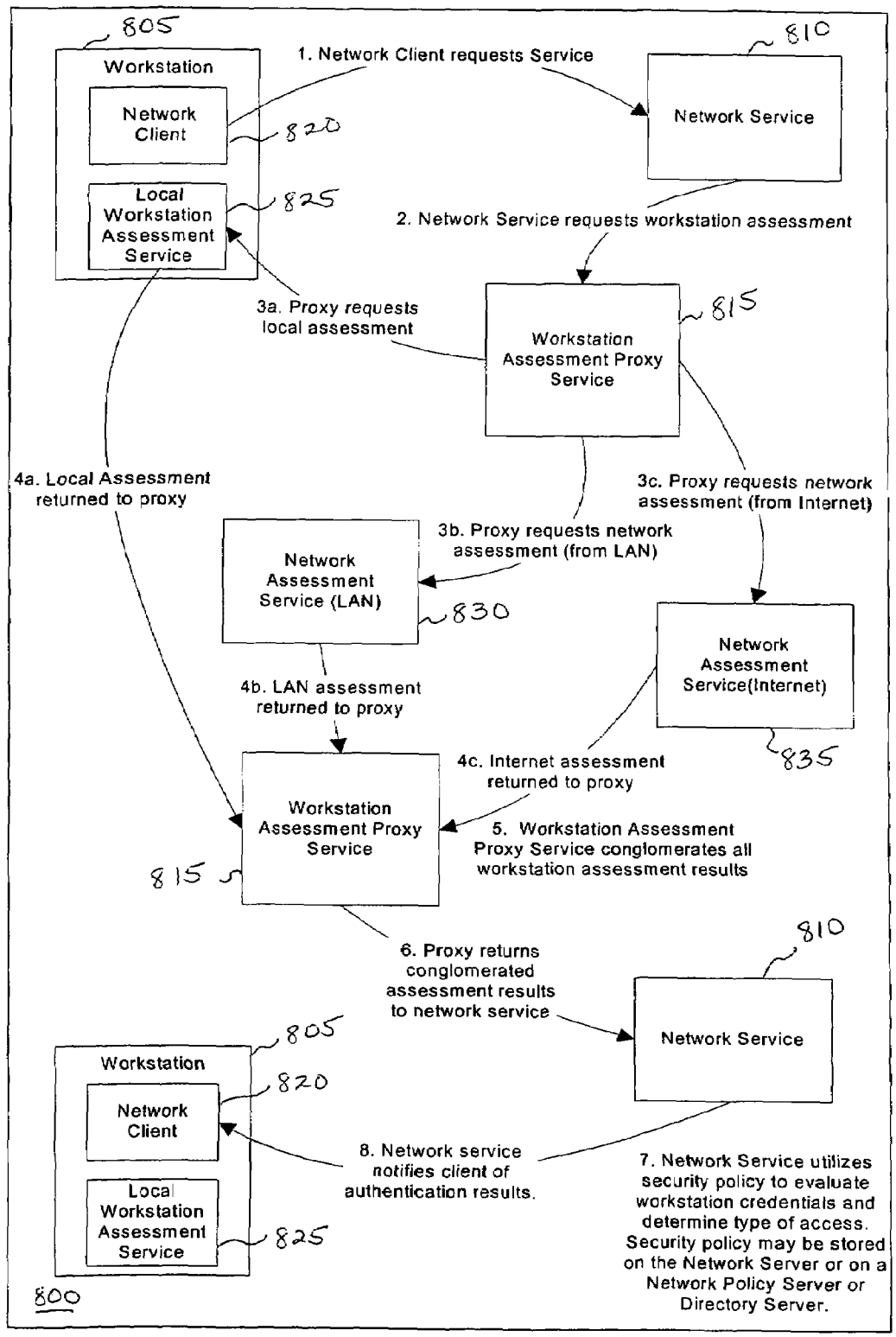
FIG. 8 is a diagram showing multiple security perspective assessments invoked by network server through a workstation assessment proxy service in accordance with an exemplary embodiment of the present invention.

FIG. 8 illustrates an exemplary network security system having a workstation assessment proxy service for processing workstation assessment results. The exemplary network security system supports a vulnerability assessment invoked by a network service and a workstation assessment completed via a proxy service typically operating on a proxy server. As shown in FIG. 8, a network workstation assessment proxy service 815 collects workstation assessment information from a variety of sources with security perspectives at the request of a network service 810 or a network client 820. This proxy service 815 communicates with different workstation assessment services, combines the assessment results, and returns the results to the network service. The different workstation assessment services can reside, for example, on a local workstation, on the Internet, on a LAN, or on a WAN. The assessment results can be cached in storage for subsequent use. These workstation assessment services provide assessments of the workstation that show security weaknesses visible for a particular level of authentication (i.e. administrative access, guest/anonymous access, normal user level access, etc.). This information can be used by the network service 810 to form a more complete estimate of the workstation's security posture and risk profile.

The exemplary network security 800 operates in a distributed computing environment comprising a workstation 805, a network service 810, a workstation assessment proxy service 815, a LAN-based network assessment service 830, and an Internet-based network assessment service 835. The distributed computing environment can include one or more workstations 805, each including a network client 820 and a local workstation assessment service 825. An authentication process is initiated in response to network client 820 generating a service request via the distributed computer network. The network service 810 responds to the service request by issuing a workstation assessment request to the workstation assessment proxy service 815. In turn, the workstation assessment proxy service 815 will issue multiple assessment requests to a variety of assessment services to evaluate the potential vulnerability of the workstation 805.

For example, the workstation assessment proxy service 815 can issue a local assessment request to the local workstation assessment service 825 via the distributed computing network. In addition, the workstation assessment proxy service 815 can issue a network assessment request to both the LAN-based network assessment service 830 and the Internet-based network assessment service 835. Each assessment service completes a scan of the workstation 805 and returns assessment results to the workstation assessment proxy service 815 via the distributed computing network.

In turn, the workstation assessment proxy service 815 can combine the assessment results and transmit the combined assessment results to the network service 810 via the distributed computer network. The network service 810 applies a workstation security policy to the combined assessment results to determine the level of service, if any, to be provided to the requesting workstation 805. The workstation security policy can be maintained on the network server hosting the network service or a separate server, such as a network policy service or a directory server. The network service 810 notifies the network client 820 of the authentication results via the distributed computing network.

Figure 9:
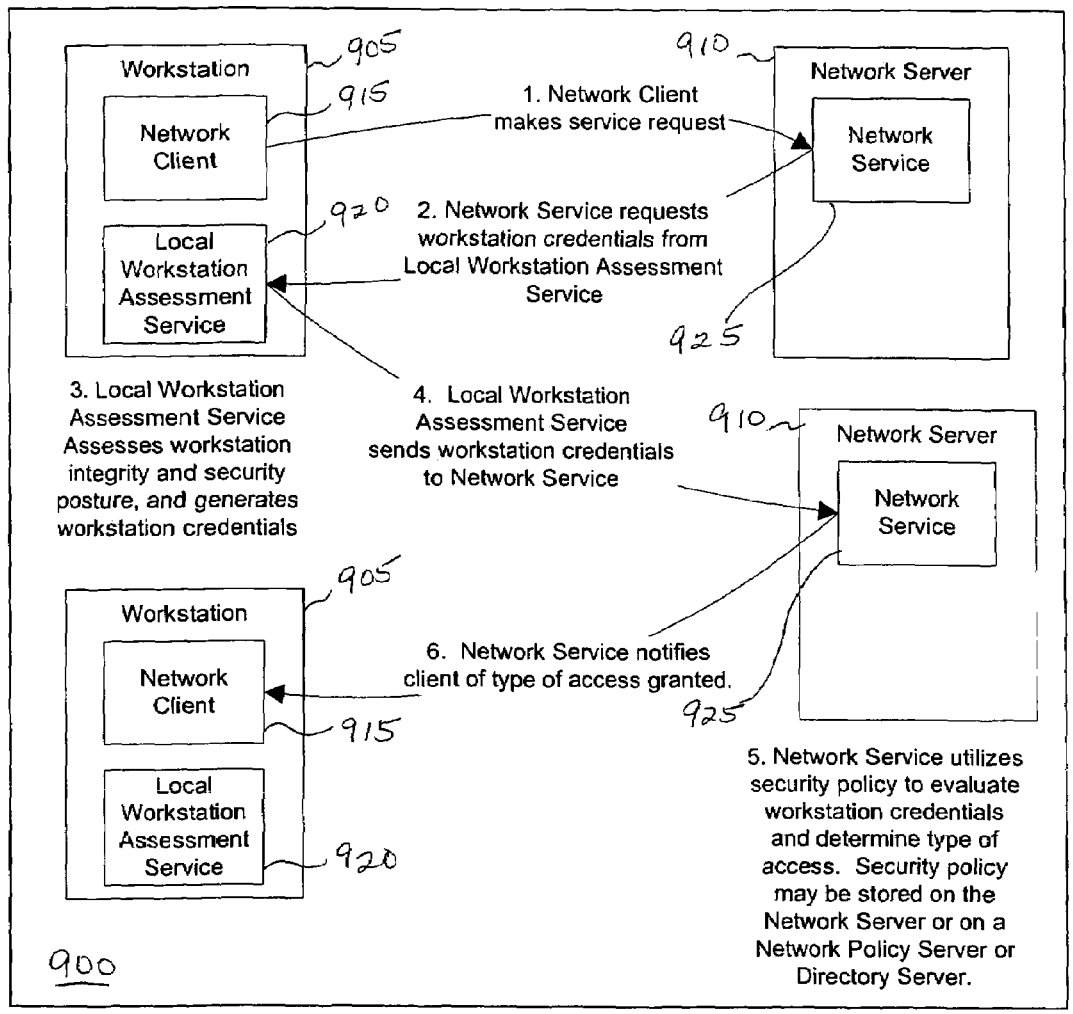
FIG. 9 is a diagram showing interactions between a workstation having a local workstation assessment and a network server having a network service in accordance with an exemplary embodiment of the present invention.

Another alternative exemplary network security system is shown in FIG. 9. The exemplary network security system supports a vulnerability assessment invoked by a network service and an assessment completed at the local worktation. The exemplary network security system 900 comprises a workstation 905 and a network server 910, each connected to a distributed computer network, such as the Internet or an intranet. The workstation 905 includes a network client 915 and a local workstation assessment service 920. The network server 910 includes one or more network services 925. To obtain a service from the network server 910, the network client 915 issues a service request to the network server 910 via the distributed computer network. In response, the network service 925 generates a request for an assessment of the workstation 905. The local workstation assessment service operating on the workstation 905 responds to the assessment request by completing a vulnerability scan of the workstation 905 and generating workstation credentials. In turn, the local workstation assessment service 920 transmits the workstation credentials to the network service 925 via the distributed computer network. The workstation credentials represent an evaluation of workstation integrity and security posture.

The network service 925 assesses a workstation security policy, typically maintained at the network server 910, to evaluate the workstation credentials. Specifically, the network service 925 compares the workstation credentials to the workstation security policy to determine the level of service to be provided, if any, to the workstation 905. Although the workstation security policy is preferably maintained on the network server 910, it will be appreciated that the security policy also can be maintained on a separate server, such as a network policy server or a directory server. Based upon the evaluation of workstation credentials, the network service 925 issues a message to notify the network client 915 of the service level to be provided by the network service 925.

In view of the foregoing, it will be appreciated that an authentication process can be implemented at a Web server, which evaluates the access of a Web service by a workstation based on workstation credentials (security posture and integrity information). The user can not log-on to the Web service unless the workstation's security posture and integrity comply with the Web service's security policy. Alternately, the user receives a level of access appropriate to the degree of compliance of the workstation's security posture and integrity with the Web service's security policy.

Alternatively, an authentication process can be implemented by a network connection. This prevents a workstation from joining a network without presenting workstation credentials for approval. This authentication process can be used when a workstation connects to a VPN or to a Microsoft Windows Domain.

The authentication process also can be implemented as an extension to an extensible authentication process, such as GSSAPI or Microsoft SSPI. Any network service that uses the extensible authentication process can validate the security of the workstation.

The authentication process can be implemented on a dial-up networking server. When a client dials up, the dial-up server validates the workstation credentials of the dialing up workstation, and decides whether to allow the call to continue or to allow degraded access to the dial-up services.

The present invention includes a Web-based system can be used for gathering, storing and presenting workstation assessment results. This system performs workstation assessments from multiple security perspectives, and stores the results in a database server. Authorized parties may later retrieve these results by connecting to the Web server. The Web server operates a Web application that grants access to the data in the database for each workstation, and provides Web reports to authorized parties. Because the system stores workstation assessment results from multiple network location and authentication perspectives, it is capable of presenting a comprehensive view of workstation security posture. This comprehensive view can include internal and external assessments of the workstation.

The present invention is directed to network security for distributed computer systems, including the client-server computing environment. Those skilled in the art will appreciate that a server can operate as a client in a server-to-server environment. In other words, the first server can be a "client" of another server in the distributed computer network. This being the case, the role of the "workstation" described throughout this document can be fulfilled by a server that is requesting access to a network service. Thus, that server would then be assessed via the workstation assessment process during the authentication process. Typically, when one server connects to another server, user credentials, if required, are provided by a computer program or process rather than by a computer user. This use of user authentication and credentials for allowing access by a computer program or process follows the same purpose and method as that of a computer user and, as such, fits within the confines of user authentication as described in this document. Moreover, a client can be implemented by a conventional desktop computing device, a mobile computing device, and other computing platforms, such as browser-enabled telephony devices and personal digital assistants (PDAs).

Significantly, the present invention can complete a vulnerability analysis of a workstation prior to completion of an authentication of the user of that workstation. A vulnerability analysis for the workstation is completed prior to user authentication because it is more difficult for an intruder to steal a user's credentials if the intrusion is detected and the user authentication process is terminated before the user presents their credentials to the workstation. Consequently, user credentials are preferably compared to a user credential database, which is typically maintained on a server separate from the workstation, only after completion of a vulnerability analysis of the workstation. Those skilled in the art will appreciate, however, that a vulnerability analysis of the workstation can also be completed after user authentication has been successfully completed. For example, the vulnerability assessment can be completed after user authentication and prior to substantive operation of a network service at the workstation.

The above-described embodiments are presented as illustrative examples. It will be readily appreciated that deviations may be made from the specific embodiments disclosed in this specification without departing from the invention. Accordingly, the scope of this invention is to be determined by the claims below rather than being limited to the specifically described embodiments above.

What is claimed is:

1. A computer-implemented process for authenticating a workstation requesting a network service from a network server via a computer network, comprising the steps:

completing a vulnerability assessment of the workstation to identify security vulnerabilities that would compromise the secure operation of the workstation on the computer network;

generating workstation security credentials based on the vulnerability assessment, the workstation security credentials comprising one of integrity information describing whether the workstation has been compromised, and security posture information describing the workstation's potential for compromise, wherein the step of generating the workstation security credentials comprises completing the vulnerability assessment of the workstation by a local workstation assessment service maintained on the workstation, the local workstation assessment service operative to generate the workstation security credentials;

comparing the workstation security credentials to a workstation security policy to determine whether the workstation should be granted access to the network service; and authorizing access to the network service by the workstation if the workstation security credentials satisfy the workstation security policy, otherwise denying access to the network service by the workstation.

2. The computer-implemented process recited by claim 1 further comprising the step of authorizing access to a predetermined level of the network service if the workstation security credentials satisfy a portion of the workstation security policy.

3. The computer-implemented process recited by claim 1, wherein the workstation security policy is maintained on the workstation, the process further comprising the step of providing the workstation security credentials from the local workstation assessment service to the workstation security policy.

4. The computer-implemented process recited by claim 1 further comprising the step of communicating a service decision from the network server to the workstation via the computer network, the service decision defining whether the workstation is allowed to access the network service or a degraded form of the network service.

5. The computer-implemented process recited by claim 1, wherein the workstation security policy is maintained on the network server, the process further comprising the step of comparing at the network server the workstation security credentials to the workstation security policy to determine whether the workstation should be granted access to the network service or a degraded form of the network service.

6. The computer-implemented process recited by claim 1, wherein the workstation security policy is operative to define security requirements for secure operation of the workstation on the computer network.

7. The computer-implemented process recited by claim 6, wherein the network service is further operative for comparing the workstation security credentials to the workstation security policy to determine whether the workstation should be granted access to a software service, the network service operative to authorize access to the software service by the workstation if the workstation security credentials satisfy the workstation security policy.

8. The computer-implemented process recited by claim 1, further comprising:

running a network client on the workstation; and retrieving the workstation credentials from the local workstation assessment service with the network client.

9. The computer-implemented process recited by claim 1, further comprising:

running a network client on the workstation;

retrieving the workstation credentials from the local workstation assessment service with the network client; and obtaining user credentials with the network client.

10. The computer-implemented process recited by claim 1, further comprising:

running a network client on the workstation; and obtaining user credentials with the network client from a user credential database.

11. The computer-implemented process recited by claim 1, further comprising:

retrieving the workstation credentials from the local workstation assessment service with a network client residing on the workstation; and obtaining user credentials with the network client from a user credential database.

12. The computer-implemented process recited by claim 1, further comprising:
    retrieving the workstation credentials from the local workstation assessment service with a network client; and
    transmitting the workstation credentials over the computer network with the network client.

13. The computer-implemented process recited by claim 1, further comprising:
    obtaining user credentials with the network client; and
    transmitting the user credentials over the computer network with the network client.

14. The computer-implemented process recited by claim 1, further comprising:
    obtaining user credentials with a network client;
    retrieving the workstation credentials from the local workstation assessment service with the network client;
    transmitting the user and workstation credentials over the computer network with the network client.

15. A computer-implemented process for authenticating a workstation requesting a network service from a network server via a computer network, comprising the steps:
    completing a vulnerability assessment of the workstation to identify security vulnerabilities that would compromise the secure operation of the workstation on the computer network;
    generating workstation security credentials based on the vulnerability assessment, the workstation security credentials comprising one of integrity information describing whether the workstation has been compromised, and security posture information describing the workstation's potential for compromise, wherein the step of generating the workstation security credentials comprises completing the vulnerability assessment of the workstation by a network workstation assessment service maintained on the network server, the network workstation assessment service operative to generate the workstation security credentials, wherein the workstation security policy is maintained on the workstation,
    providing the workstation security credentials from the network workstation assessment service to the workstation security policy on the workstation via the computer network;
    comparing the workstation security credentials to a workstation security policy to determine whether the workstation should be granted access to the network service; and
    authorizing access to the network service by the workstation if the workstation security credentials satisfy the workstation security policy, otherwise denying access to the network service by the workstation.

16. The computer-implemented process recited by claim 15 further comprising the step of authorizing access to a predetermined level of the network service if the workstation security credentials satisfy a portion of the workstation security policy.

* * * * *